United States Patent
Sharma

(10) Patent No.: US 10,231,096 B2
(45) Date of Patent: Mar. 12, 2019

(54) MOTION-BASED COMMUNICATION MODE SELECTION

(71) Applicant: Visa International Service Association, San Francisco, CA (US)

(72) Inventor: Sanjeev Sharma, Sunnyvale, CA (US)

(73) Assignee: Visa International Service Association, San Francisco, CA (US)

(*) Notice: Subject to any disclaimer, the term of this patent is extended or adjusted under 35 U.S.C. 154(b) by 50 days.

(21) Appl. No.: 14/859,047

(22) Filed: Sep. 18, 2015

(65) Prior Publication Data

US 2016/0088449 A1    Mar. 24, 2016

Related U.S. Application Data

(60) Provisional application No. 62/053,019, filed on Sep. 19, 2014.

(51) Int. Cl.

| | |
|---|---|
| *H04M 1/725* | (2006.01) |
| *H04W 4/12* | (2009.01) |
| *H04L 29/06* | (2006.01) |
| *H04W 4/02* | (2018.01) |
| *G06Q 20/32* | (2012.01) |
| *G06F 3/01* | (2006.01) |
| *H04W 88/06* | (2009.01) |
| *H04M 1/2755* | (2006.01) |

(52) U.S. Cl.
CPC .............. *H04W 4/12* (2013.01); *G06F 3/017* (2013.01); *G06Q 20/327* (2013.01); *H04L 69/18* (2013.01); *H04M 1/72569* (2013.01); *H04W 4/027* (2013.01); *H04M 1/2755* (2013.01); *H04M 1/7253* (2013.01); *H04M 1/72572* (2013.01); *H04W 88/06* (2013.01)

(58) Field of Classification Search
CPC ........ H04W 4/12; H04W 4/027; H04L 69/18; H04M 1/72572; H04M 1/72569
See application file for complete search history.

(56) References Cited

U.S. PATENT DOCUMENTS

| | | | |
|---|---|---|---|
| 6,295,448 B1 | 9/2001 | Hayes | |
| 7,774,231 B2 | 8/2010 | Pond | |
| 8,172,135 B1 | 5/2012 | Aidasani | |
| 8,761,809 B2 | 6/2014 | Faith | |
| 2001/0034232 A1* | 10/2001 | Kuwahara | ............. H04W 60/04 455/435.1 |

(Continued)

*Primary Examiner* — Mazda Sabouri
*Assistant Examiner* — Edward Zhang
(74) *Attorney, Agent, or Firm* — Kilpatrick Townsend & Stockton LLP

(57) ABSTRACT

Embodiments of the invention are directed to apparatus and methods for providing motion-based communication mode selection on a mobile device. In some embodiments, a mobile device can compare a detected motion of the mobile device to a plurality of predetermined motions. Each of the plurality of predetermined motions being can be associated with a different communication mode of the mobile device. A communication mode associated with the detected motion can be identified by the mobile device based at least in part on the comparison, and the identified communication mode can correspond to a communication protocol. The mobile device can generate a data message in accordance with the communication protocol, and can provide this data message to a receiver device.

18 Claims, 10 Drawing Sheets

(56) References Cited

U.S. PATENT DOCUMENTS

| | | | |
|---|---|---|---|
| 2007/0026869 A1* | 2/2007 | Dunko | G06F 1/1613 |
| | | | 455/456.1 |
| 2011/0187642 A1 | 8/2011 | Faith | |
| 2012/0310587 A1* | 12/2012 | Tu | G01D 1/16 |
| | | | 702/141 |
| 2013/0006847 A1 | 1/2013 | Hammad | |
| 2013/0053007 A1* | 2/2013 | Cosman | G06F 3/017 |
| | | | 455/414.3 |
| 2013/0191789 A1 | 7/2013 | Calman | |
| 2013/0282269 A1* | 10/2013 | Hannukainen | G01C 21/3484 |
| | | | 701/400 |
| 2013/0316686 A1* | 11/2013 | Subbaramoo | H04W 12/02 |
| | | | 455/418 |
| 2013/0344901 A1* | 12/2013 | Garin | H04W 4/026 |
| | | | 455/456.6 |
| 2014/0171068 A1* | 6/2014 | Marti | G01S 1/047 |
| | | | 455/427 |
| 2014/0365163 A1* | 12/2014 | Jallon | A61B 5/1116 |
| | | | 702/141 |

* cited by examiner

MEMORY 102(i)

MOTION-TO-COMMUNICATION MODE MAPPINGS
102(k)

DATA TABLE 300

| MOTION 300(a) | COMMUNICATION MODE 300(b) | CONFIDENCE THRESHOLD 300(c) |
|---|---|---|
| ROTATION 1 | MODE A | X% |
| ROTATION 2 | MODE B | Z% |
| ROTATION 3 | MODE C | Y% |
| TRANSLATION 1 | MODE D | X% |
| TRANSLATION 2 | MODE E | Y% |
| TRANSLATION 3 | MODE F | W% |
| TRANSLATION 4 | MODE G | X% |
| TRANSLATION 5 | MODE H | X% |
| ROTATION 1 + TRANSLATION 1 | MODE I | V% |
| ROTATION 2 + TRANSLATION 5 | MODE J | Z% |

*FIG. 3*

MOTION-BASED COMMUNICATION MODE SELECTION

CROSS-REFERENCES TO RELATED APPLICATIONS

The present application is a non-provisional application of and claims priority to U.S. Provisional Application No. 62/053,019, filed on Sep. 19, 2014, the entire contents of which are herein incorporated by reference for all purposes.

BACKGROUND

The present disclosure relates generally to mobile device communication, and more particularly to motion-based communication mode selection on a mobile device.

Mobile devices such as smart phones can be configured for communication using many different communication protocols including cellular, WiFi, near field communication (NFC), Bluetooth, two-dimensional barcodes (e.g., QR codes), and the like. To initiate communication in a desired protocol, however, a user must typically have to open an application on their mobile device specifically associated with the communication protocol.

For example, in the context of a contactless payment transaction at a merchant point of sale (POS) terminal, a user may have the option to initiate a payment with their mobile device by communicating with the POS terminal using an NFC or two-dimensional barcode protocol. To select the desired protocol, the user generally must first "unlock" their mobile device and then open a specific payment application before the payment is initiated. In some instances, upon opening the payment application, the user may also need to navigate through a list of available protocols to locate and select the protocol desired for making the payment. This may be cumbersome and time-consuming for users, and may result in delays at the merchant and may discourage users from making use of certain contactless protocols available to them.

In another example, a user may wish to use their mobile device to send a message to another user's mobile device. To do so, however, the user must typically first open an application on their mobile device configured to transmit the message in the desired communication protocol. If the user wishes to send an SMS text message, as an example, they may first need to open an application programmed to transmit SMS text messages. But if the user desires to send an email message, a separate email application may first need to be opened. As in the contactless payment scenario, this process can be time-consuming, especially when the user's mobile device includes many installed applications that must be navigated to locate and select the application associated with the desired communication protocol.

Embodiments of the invention address these and other problems.

BRIEF SUMMARY

Embodiments of the invention are directed to apparatus and methods for providing motion-based communication mode selection on a mobile device.

One embodiment of the invention is directed to a mobile the device. The mobile device can comprise a motion detection sensor, a communication interface, and a processor coupled to the motion detection sensor and the communication interface. The processor can be configured to receive a signal from the motion detection sensor, the signal identifying a motion of the mobile device detected by the motion detection sensor. The processor can be further configured to compare the detected motion of the mobile device to a plurality of predetermined motions, each of the plurality of predetermined motions being associated with a different communication mode of the mobile device, and to identify a communication mode associated with the detected motion of the mobile device based at least on part on the comparison, the identified communication mode corresponding to a communication protocol. The processor can be further configured to generate a data message in accordance with the communication protocol, and provide the data message to a receiver device via the communication interface.

Another embodiment of the invention is directed to a method. The method can comprise detecting, by a mobile device, a motion of the mobile device. The mobile device can compare the detected motion of the mobile device to a plurality of predetermined motions, each of the plurality of predetermined motions being associated with a different communication mode of the mobile device. The mobile device can identify a communication mode associated with the detected motion of the mobile device based at least in part on the comparison, the identified communication mode corresponding to a communication protocol. The mobile device can generate a data message in accordance with the communication protocol, and provide the data message to a receiver device.

These and other embodiments of the invention are described in detail below.

BRIEF DESCRIPTION OF THE DRAWINGS

FIG. 3 illustrates an exemplary data table containing motion-to-communication mode mappings in accordance with some embodiments.

DEFINITIONS

Figure 1:
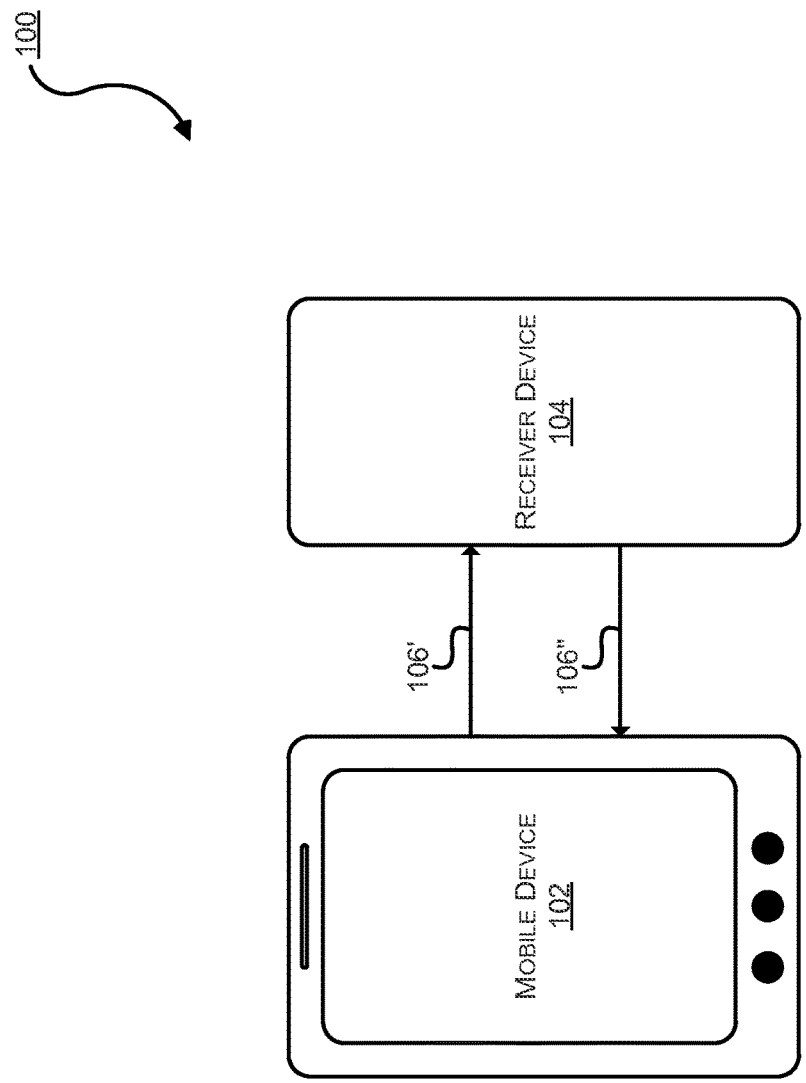
FIG. 1 illustrates a block diagram of an exemplary mobile communication system in accordance with some embodiments.

Prior to further describing embodiments of the invention, a description of some terms may be helpful in understanding embodiments of the invention.

A "mobile device" may include any computing device configured to communicate with another computing device, such as a receiver device. A mobile device may be in any suitable form. Exemplary mobile devices include, but are not limited to, mobile phones (e.g., smart phones), tablet computers, media players, wearable devices (e.g., smart watches, fitness bands, ankle bracelets, rings, earrings, and the like), laptop computers, net books, PDAs, and the like. A mobile device may use any suitable contact-based or contactless mode of operation to communicate with a receiver device.

A "receiver device" may include any computing device configured to communicate with a mobile device. Exemplary receiver devices include, but are not limited to, merchant POS terminals, server computers, desktop computers, mobile phones (e.g., smart phones), tablet computers, media players, wearable devices (e.g., smart watches, fitness bands, ankle bracelets, rings, earrings, and the like), laptop computers, net books, PDAs, and the like. A receiver device may use any suitable contact-based or contactless mode of operation to communicate with a mobile device device.

A "communication interface" may include any component(s) of a mobile device configured to facilitate communication by the mobile device. A communication interface can include any suitable hardware and/or software including, but not limited to, a display screen, NFC elements, WiFi (e.g., IEEE 802.11) elements, Bluetooth elements, and the like, or any suitable combination thereof.

A "processor" may include hardware within a mobile device that carries out instructions embodied as code in a memory (e.g., a non-transitory computer-readable medium). An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a mobile device.

A "motion detection sensor" may include hardware and/or software within a mobile device configured to detect motion of the mobile device. Exemplary motion detection sensors include, but are not limited to, accelerometers, gyroscopes, compasses, altimeters, and the like.

A "motion" of a mobile device may include any movement of a mobile device from one position to another position, from one orientation to another orientation, and/or the like. A motion of a mobile device can include, for example, a rotation of the mobile device, a translational motion of the mobile device, or a combination thereof. In some embodiments, a motion of a mobile device can include a particular path travelled by the mobile device from one position to another.

A "communication mode" may include any mode of a mobile device that facilitates communication by the mobile device with a receiver device. A communication mode can correspond to a communication protocol. Exemplary communication protocols can include, but are not limited to, cellular, WiFi, NFC, Bluetooth, two-dimensional barcode, and the like.

A "confidence value" may include a value (e.g., a number) representing a level of confidence that a criteria is met. In some embodiments, a confidence value calculated by a mobile device can represent the likelihood a detected motion of the mobile device corresponds to a predetermined motion of the mobile device, the predetermined motion being associated with a communication mode of the mobile device.

"Location determination circuitry" can include hardware and/or software within a mobile device and configured to determine a location of the mobile device. Location determination circuitry can utilize various types of data including, but not limited to, Global Positioning System (GPS) data, cellular phone tower triangulation data, cellular phone tower signal strength data, wireless access point location data, an Internet Protocol (IP) address, or any other suitable data usable by the location determination circuitry to determine a location of a mobile device.

DETAILED DESCRIPTION

Embodiments of the invention are directed to apparatus and methods for providing motion-based communication mode selection on a mobile device. A mobile device (e.g., a smart phone) can include a motion detection sensor configured to detect motions (e.g., rotational and/or translation) of the mobile device. When such a motion is detected, the mobile device can compare the detected motion to a plurality of predetermined motions (e.g., stored in a memory of the mobile device). Each of the predetermined motions can be associated with a different communication mode of the mobile device configured, for example, to facilitate communication by the mobile device using a particular protocol (e.g., NFC, WiFi, two-dimensional barcode, Bluetooth, etc.).

The detected motion of the mobile device can be compared to the plurality of predetermined motions. In some embodiments, this comparison can include a calculation by the mobile device of a confidence value corresponding to a likelihood the detected motion corresponds to one of the plurality of predetermine motions. Based at least in part on the comparison, the mobile device can identify a communication mode of the mobile device associated with the detected motion, the communication mode corresponding to a communication protocol. For example, in some embodiments, the mobile device can determine that the calculated confidence value exceeds some threshold confidence value. In response, a data message can be generated by the mobile device in accordance with the communication protocol. This data message can then be transmitted by the mobile device to a receiver device.

In some embodiments, the mobile device can also include location determination (e.g., GPS) circuitry configured to determine a location of the mobile device. In such embodiments, as described in further detail below, the location of the mobile device at the time the motion is detected can be used to further identify and confirm the communication mode associated with the detected motion.

As an illustration, a user may initiate a contactless payment transaction at a merchant POS terminal using their mobile device. The POS terminal may be configured to accept payment via multiple communication protocols including, for example, NFC and two-dimensional barcode. In this illustration, the user's mobile device can include a memory storing a plurality of communication modes, with each mode being associated with a different predetermined motion of the mobile device. For example, the memory may associate an NFC communication mode with a downward translational motion of the mobile device, and may further associate a two-dimensional barcode communication mode with a rotational motion of the mobile device.

The user can select a desired communication mode for initiating the payment transaction by moving the mobile device in one of the predetermined manners. For example, if the user wishes to use NFC to conduct the payment transaction, they can move the mobile device in a downward translational motion (e.g., towards an NFC receiver of the POS terminal). Alternatively, if the user prefers a two-dimensional barcode transaction, the user can cause the mobile device to rotate such that a display screen of the mobile device is facing an optical barcode scanner of the POS terminal at the end of the rotation. In either case, a motion detection sensor (e.g., an accelerometer, gyroscope, and/or the like) can detect the motion of the mobile device caused by the user.

Upon detecting the motion, the mobile device can then compare the detected motion to the plurality of predetermined motions stored in the memory of the mobile device. This comparison can involve the mobile device calculating a confidence value representing the likelihood that the detected motion of the mobile device corresponds to one of the plurality of predetermined motions. In some embodiments, such a confidence value can also be affected by a location of the mobile device. For example, using location determination circuitry, the mobile device can determine that it is currently located at a merchant. Since the user may initiate a motion of the mobile device in a scenario where a contactless payment is not desired (e.g., at the user's home), determining the location of the mobile device can prevent false positives. In some embodiments, the calculated confidence value can be decreased or increased based on the determined location of the mobile device. In this illustration, the determination that the mobile device is located at a merchant may increase the confidence value.

If the calculated confidence value meets (or exceeds) a threshold confidence value, this may confirm to the mobile device that the detected motion corresponds to one of the plurality of predetermined motions stored in the memory of the mobile device. A communication mode can then be identified by the mobile device, the communication mode being associated with the detected motion. In this illustration, if the detected motion is the downward translational motion, the identified mode can be the NFC communication mode. If, however, the detected motion is the rotational motion, the identified communication mode can instead be the two-dimensional barcode mode.

In response to identifying the associated mode and corresponding communication protocol, the mobile device can generate a data message in accordance with the protocol. This data message can then be provided to the merchant's mobile POS terminal to initiate the contactless payment transaction. For example, if the NFC communication mode was identified, the mobile device can generate and transmit an NFC (e.g., radio) communication message to the NFC receiver of the POS terminal, thereby initiating the contactless transaction. Alternatively, if the two-dimensional barcode mode was identified, the mobile device can generate and display a two-dimensional barcode on the display screen of the mobile device. An optical barcode scanner of the POS terminal can read the displayed two-dimensional barcode to initiate the payment transaction.

Embodiments of the invention can provide a number of advantages. For example, by utilizing motion-based communication mode selection, a user can initiate one of many communication modes of their mobile device without having to unlock the mobile device, open a specific application, and navigate through a list of available communication protocols to locate and select the desired protocol. This may result in communication mode selection being more convenient and efficient for users, while encouraging users to make use of the many potential communication protocols available to them.

In some embodiments, a user may still be required to open an application (e.g., a payment application) prior to selecting a particular communication mode. Even in such embodiments, however, the user may not need to navigate through and select the desired protocol. This is because the user can simply move their mobile device in a predetermined manner associated with the protocol to be utilized. Upon confirming at a threshold level of confidence that a detected motion is associated with a communication mode, the mobile device can communicate with a receiver device using the corresponding protocol without further input from the user. Moreover, irrespective of whether an application is first opened by the user, embodiments can provide a solution to existing scenarios where different communication modes require that the user open different applications corresponding to each mode (e.g., an email application, SMS text message application, etc.).

I. Exemplary Systems

FIG. 1 illustrates a block diagram of an exemplary mobile communication system 100 in accordance with some embodiments. As seen in FIG. 1, system 100 can include a mobile device 102 and a receiver device 104. Mobile device 102 can communicate with receiver device 104 using a plurality of different communication modes, each being associated with a particular communication protocol. For example, mobile device 102 and receiver device 104 can be configured to exchange data messages 106' and 106" using many different communication protocols.

Mobile device 102 can be in any suitable form. For example, a suitable mobile device can be hand-held and compact so that it can fit into a wallet and/or pocket (e.g., pocket-sized) of a user. Exemplary mobile devices can include, but are not limited to, mobile phones (e.g., smart phones), tablet computers, media players, wearable devices (e.g., smart watches, fitness bands, ankle bracelets, rings, earrings, and the like), laptop computers, net books, PDAs, and the like. Mobile device 102 can operate in a contact-based mode (e.g., using data stored in a magnetic stripe format) and/or in a contactless mode (e.g., using a two-dimensional barcodes displayed on a display screen, NFC, WiFi, Bluetooth, the like) to communicate with receiver device 104.

Receiver device 104 can also be in any suitable form. Exemplary receiver devices can include, but are not limited to, merchant POS terminals, server computers, desktop computers, mobile phones (e.g., smart phones), tablet computers, media players, wearable devices (e.g., smart watches, fitness bands, ankle bracelets, rings, earrings, and the like), laptop computers, net books, PDAs, and the like. Receiver device 104 may operate in any suitable contact-based or contactless mode to communicate with mobile device 102.

Figure 2:
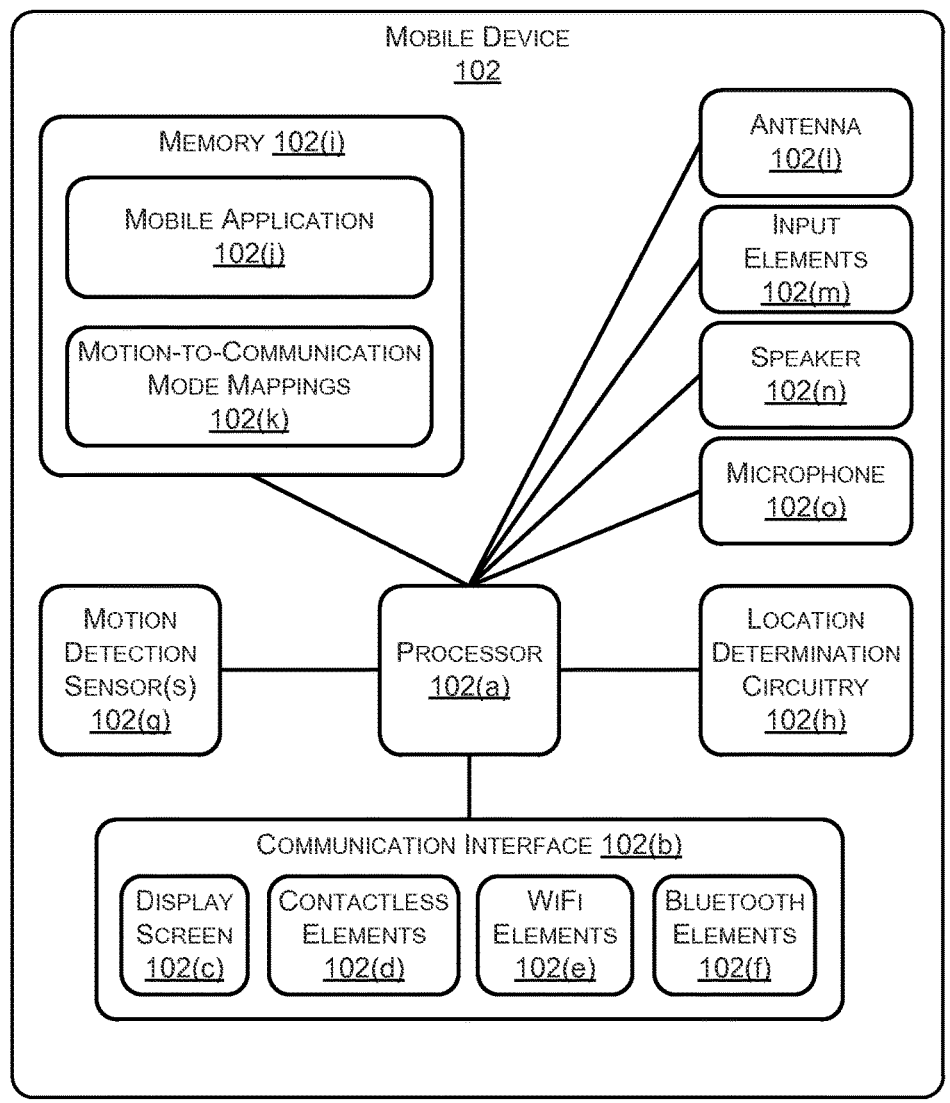
FIG. 2 illustrates a block diagram of an exemplary mobile device in accordance with some embodiments.

FIG. 2 illustrates a block diagram of an exemplary mobile device, i.e. mobile device 102, in accordance with some embodiments. As shown, mobile device 102 can comprise a plurality of hardware components and software modules 102(*a*)-102(*o*). However, it should be appreciated that this is provided for illustration purposes only, and each of the components, modules, and associated functionality described herein may be provided (or otherwise performed) by the same or different components and/or modules. That is, mobile device 102 may, for example, perform some of the relevant functions and steps described herein through the use of any suitable combination of software instructions and/or hardware configurations. It should also be noted that although FIG. 2 illustrates all of the components and modules located on a single device (i.e. mobile device 102), the disclosure is not meant to be so limited. Moreover, a system for implementing the functionality described herein may have additional components and/or modules or less than all of these components and modules. Additionally, some components and/or modules may be located on other devices such as a remote server or other local devices that are functionally connected to mobile device 102.

Mobile device 102 is shown as comprising a processor 102(a) and a memory 102(i) operatively coupled to processor 102(a). Processor 102(a) can carry out instructions embodied as code in memory 102(i). Processor 102(a) can be a central processing unit (CPU). Exemplary processors include, but are not limited to, a single-core processor, a plurality of single-core processors, a multi-core processor, a plurality of multi-core processors, or any other suitable combination of hardware configured to perform arithmetical, logical, and/or input/output operations of mobile device 102. Memory 102(i) can be a non-transitory computer readable medium comprising any suitable combination of volatile and/or non-volatile memory such as, for example, buffer memory, RAM, DRAM, ROM, flash, disk drives, or any other suitable storage media. In some embodiments, one or more of the software modules illustrated in FIG. 2 can be stored on memory 102(i) including, for example, a mobile application 102(j) and motion-to-communication mode mappings 102(k).

Mobile application 102(i) can be any suitable application executable by processor 102(a) of mobile device 102. In some embodiments, mobile application 102(i) is a mobile payment application. In some other embodiments, mobile application 102(i) can instead be a more generic application programmed to facilitate the motion-based communication mode selection techniques described herein.

Mobile device 102 can further include one or more motion detection sensors 102(g) operatively coupled to processor 102(a). Motion detection sensors 102(g) can comprise hardware and/or software configured to detect various motions of mobile device 102. Exemplary motion detection sensors can include, but are not limited to accelerometers, gyroscopes, compasses, altimeters, and the like. Motion detection sensors 102(g) can detect a movement of mobile device 102 from one position to another position, from one orientation to another orientation, and/or combinations thereof. Suitable detectable motions can include, but are not limited to, rotations, translational motions, and combinations thereof. In some embodiments, detectable motions can include particular paths traveled by mobile device 102 from one position to another.

In some embodiments, mobile device 102 can further include location determination circuitry 102(h) operatively coupled to processor 102(a) and configured to determine a location (e.g., geographic location) of mobile device 102. Location determination circuitry 102(h) can include any suitable hardware and/or software, and can utilize various types of data to determine a location of mobile device 102. Suitable data usable by location determination circuitry 102(h) can include, but is not limited to, GPS data, cellular phone tower triangulation data, cellular phone tower signal strength data, wireless access point location data, an Internet Protocol (IP) address, and the like.

Mobile device 102 can further include a communication interface 102(b) operatively coupled to processor 102(a). Communication interface 102(b) can include any suitable combination of components configured to facilitate communication by mobile device 102. For example, as shown in FIG. 2, communication interface 102(b) can include a display screen 102(c), contactless elements 102(d), WiFi elements 102(e), and Bluetooth elements 102(f).

Display screen 102(c) can be configured to communicate displayed content (e.g., a two-dimensional barcode) to another device (e.g., receiver device 104) and, in some embodiments, can be a touch screen further configured to receive touch input from a user. Contactless elements 102(d) can be configured to communicate using a short range wireless communication protocol such as NFC. Contactless elements 102(d) can include a semiconductor chip (or other data storage element) with an associated wireless transfer (e.g., data transmission) element, such as an antenna. WiFi elements 102(e) can include any hardware and/or software configured to communicate using a local area wireless computer networking protocol (e.g., an IEEE 802.11 standard). Bluetooth elements 102(f) can include any suitable hardware and/or software configured to communicate using ultra high frequency (UHF) radio waves.

As shown in FIG. 2, mobile device 102 can further include an antenna 102(1) which can be configured, for example, to communicate via a cellular network (e.g., 3G, 4G EDGE, and the like), input elements 102(m) such as one or more buttons which can be configured to allow a user to provide input to mobile device 102, a speaker 102(n) configured to provide audio output, and a microphone 102(o) configured to receive audio input. A housing (not shown) may house one or more of the hardware components illustrated in FIG. 2.

FIG. 3 illustrates an exemplary data table 300 containing motion-to-communication mode mappings 102(i) in accordance with some embodiments. As described above and shown in FIG. 3, motion-to-communication mode mappings 102(i) can be stored in memory 102(i) of mobile device 102. In some other embodiments, all or part of motion-to-communication mode mappings 102(i) can be stored remotely from mobile device 102 in, for example, a remote server computer communicatively coupled to mobile device 102.

As shown in FIG. 3, data table 300 can include relational data fields containing data representing predetermined motions 300(a) of mobile device 102, associated communication modes 300(b), and corresponding confidence threshold values 300(c). Motions 300(a) can include rotations of mobile device 102, translational motions of mobile device 102, and combinations thereof. Rotations can be with respect to any suitable number of axes. For example, in some embodiments, rotations can include rotations about an x-axis running parallel to the length of mobile device 102, rotations about a y-axis running parallel to the width of mobile device 102 (and perpendicular to the x-axis), and rotations about a z-axis running parallel to the thickness of mobile device 102 (e.g., intersecting display screen 102(c) and perpendicular to both the x-axis and y-axis). Any suitable translational motions of mobile device 102 can also be represented in data table 300. Such translational motions can be in any suitable direction, across any suitable distance, and in accordance with any suitable path.

Communication modes 100(b) in data table 300(b) are each associated with one of motions 300(a) of mobile device 102. This, however, is not intended to be limiting. In some embodiments, a communication mode may be associated with more than one motion of mobile device 102 such that the communication mode can be initiated in response to multiple different motions of mobile device 102. Each of communication modes 300(b) of mobile device 102 can be associated with a communication protocol. As described herein, exemplary communication protocols can include, but are not limited to, cellular, WiFi, NFC, Bluetooth, two-dimensional barcode, and the like.

In some embodiments, motions 300(a) and associated communication modes 300(b) can be established automatically as default settings. Alternatively, in some embodiments, communication modes 300(b) and associated motions 300(a) can be provided by the user. For example, in a setup process, the user can select a particular communication mode and then move mobile device 102 in a desired way, thereby resulting in the user-provided motion being stored in data table 300 and associated with the selected communication mode.

Confidence threshold values 300(c) can include values (e.g., numbers) representing a minimum confidence level that must be calculated by mobile device 102 in order to initiate a communication mode in response to detecting an associated motion of mobile device 102. In some embodiments, confidence threshold values 300(c) can be default values established for each motion and associated communication mode. Confidence threshold values 300(c) can be configured or otherwise customized by a user in some embodiments. Confidence threshold values 300(c) can be a different value for each motion and associated communication mode or, in some embodiments, some or all of the possible associated motions and communication modes can have the same confidence threshold value. Confidence threshold values 300(c) can be set automatically or by the user to avoid false positives where an inadvertent motion of mobile device 102 (or a motion intended by the user for other purposes) causes mobile device 102 to initiate a communication mode. For example, when a motion is similar to a common motion regularly used (e.g., lifting the mobile device up to the user's ear), a confidence threshold value associated with a similar predetermined motion can be set as a high value. As another example, for highly specific and uncommon motions (e.g., involving combinations of rotations and translational motions), the associated confidence threshold value can be lower since there is less likelihood of a false positive.

Predetermined motions 300(a) can include motion data that can be compared to motions detected by mobile device 102. For example, rotational motions can be represented by motion data describing one or more axes of rotation, degrees of rotation (e.g., 45°, 90°, 135°, 180°, etc.), and other measurable aspects of a rotation of mobile device 102. Translational motions can be represented by motion data describing coordinates (e.g., in a reference coordinate system) corresponding to movements of mobile device 102 from one position to another. Such translational motions can be linear or curved. Thus, in some embodiments, the particular paths of translational movement of mobile device 102 can be represented by motion data in data table 300. When a motion of mobile device 102 is detected, predetermined motions 300(a) can be compared to the detected motion. If a match if found with a confidence level equal to or greater than the corresponding confidence threshold value included in data table 300, the associated communication mode can be initiated (e.g., by generating and transmitting a data message in accordance with a protocol corresponding to the communication mode).

It should be noted that the arrangement and content of fields shown in data table 300 are provided only as an illustration. Data tables according to embodiments of the invention may include any suitable number of fields including fewer or more fields than that shown in data table 300 and/or different data fields altogether. For example, in some embodiments, data table 300 can include data describing likely (and/or unlikely) locations at which a user may wish to initiate a particular communication mode. In the context of communication modes used to conduct electronic payment transactions, likely locations may include merchant locations. In some embodiments, when a detected motion is "matched" to a predetermined motion at a location (or type of location) included in data table 300, this may result in an increased confidence value calculated by mobile device 102. Alternatively, if the motion is detected at a location at which a user is unlikely to desire the associated communication mode (e.g., a contactless payment mode when the user is at their home), this may reduce the calculated confidence value. Embodiments of the invention may also include other arrangements of data different than the relational data fields illustrated in FIG. 3.

Figure 4:
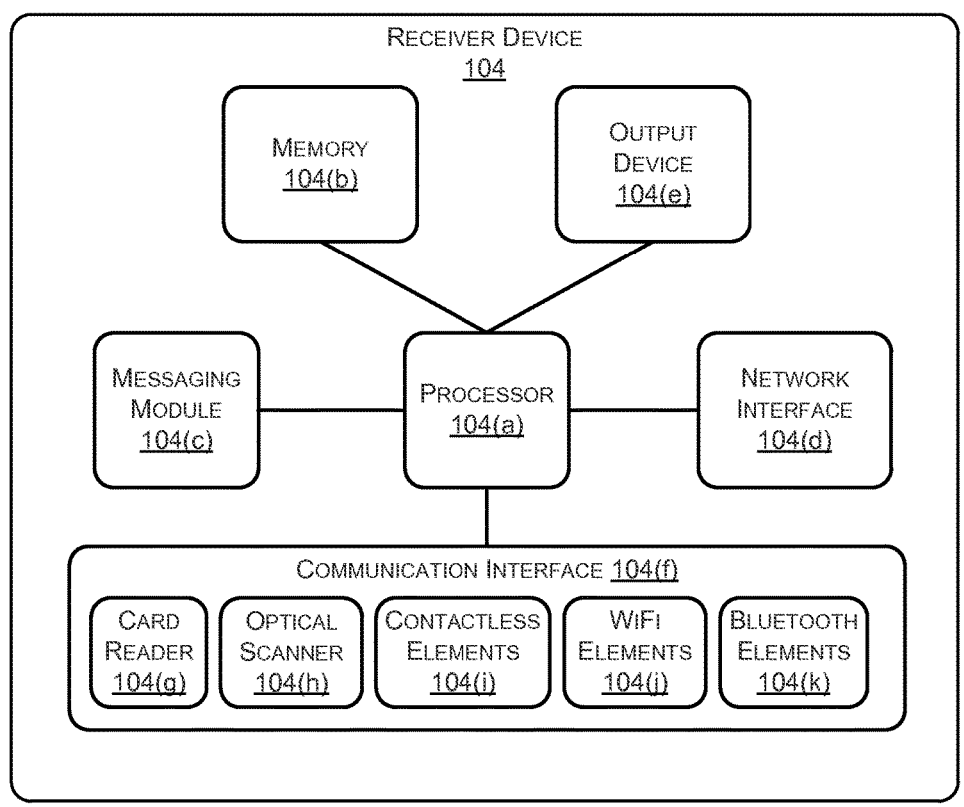
FIG. 4 illustrates a block diagram of an exemplary receiver device in accordance with some embodiments.

FIG. 4 illustrates a block diagram of exemplary receiver device 104 in accordance with some embodiments. As shown, receiver device 104 can comprise a plurality of hardware components and software modules 104(a)-104(k). However, it should be appreciated that this is provided for illustration purposes only, and each of the components, modules, and associated functionality described herein may be provided (or otherwise performed) by the same or different components and/or modules. That is, receiver device 104 may, for example, perform some of the relevant functions and steps described herein through the use of any suitable combination of software instructions and/or hardware configurations. It should also be noted that although FIG. 4 illustrates all of the components and modules located on a single device (i.e. receiver device 104), the disclosure is not meant to be so limited. Moreover, a system for implementing the functionality described herein may have additional components and/or modules or less than all of these components and modules. Additionally, some components and/or modules may be located on other devices such as a remote server or other local devices that are functionally connected to receiver device 104.

Receiver device 104 is shown as comprising a processor 104(a) and a memory 104(b) operatively coupled to processor 104(a). Processor 104(a) can carry out instructions embodied as code in memory 104(b). Processor 104(a) can be a central processing unit (CPU). Exemplary processors include, but are not limited to, a single-core processor, a plurality of single-core processors, a multi-core processor, a plurality of multi-core processors, or any other suitable combination of hardware configured to perform arithmetical, logical, and/or input/output operations of receiver device 104. Memory 104(b) can be a non-transitory computer readable medium comprising any suitable combination of volatile and/or non-volatile memory such as, for example, buffer memory, RAM, DRAM, ROM, flash, disk drives, or any other suitable storage media. In some embodiments, one or more of the software modules illustrated in FIG. 4 can be stored on memory 104(b).

Receiver device 104 can further include a communication interface 104(f) operatively coupled to processor 104(a). Communication interface 104(f) can include any suitable combination of components configured to facilitate communication by receiver device 104 with, for example, a mobile device (e.g., mobile device 102) or other device (e.g., another mobile device, a remote server computer, etc.). For example, as shown in FIG. 4, communication interface 104(f) can include a card reader 104(g), an optical scanner 104(h), contactless elements 104(i), WiFi elements 104(j), and Bluetooth elements 104(k).

Card reader 104(g) can be configured receive magnetic stripe data from a payment device such as mobile device 102 and/or from a magnetic stripe on a conventional payment card (e.g., a credit card, debit card, prepaid card, or the like).

Optical scanner 104(h) can include hardware and software configured to facilitate communication by optical means. In some embodiments, such optical means can include communication by way of two-dimensional barcodes generated by a mobile device (e.g., mobile device 102). For example, in some embodiments, optical scanner 104(h) can include a light source, a lens, and light sensor that translates optical impulses into electrical impulses. Optical scanner 104(h) can further include decoder circuitry configured to analyze a two-dimensional barcode detected by the light sensor in order to decode the data represented by the barcode.

Contactless elements 104(i) can be configured to communicate using a short range wireless communication protocol such as NFC. Contactless elements 104(i) can include a semiconductor chip (or other data storage element) with an associated wireless transfer (e.g., data receiving) element, such as an antenna. WiFi elements 104(j) can include any hardware and/or software configured to communicate using a local area wireless computer networking protocol (e.g., an IEEE 802.11 standard). Bluetooth elements 104(k) can include any suitable hardware and/or software configured to communicate using ultra high frequency (UHF) radio waves.

As shown in FIG. 4, receiver device 104 can further include a messaging module 104(c), a network interface 104(d), and an output device 104(e). A housing (not shown) may house one or more of the components illustrated in FIG. 4.

Output device 104(e) may be configured or programmed to perform some or all of the functionality associated with providing output to a user. Output device 104(e) may include a display and/or an audio output device such as one or more speakers. In some embodiments, output device 104(e) can also include one or more buttons or other input elements to allow input to be provided to receiver device 104 by a user. In some embodiments, output device 104(e) can include a touchscreen that may operate to both receive input and provide visual output.

Messaging module 104(c) may be configured to perform some or all the functionality associated with exchanging and analyzing data messages. In some embodiments, where receiver device 104 is a merchant POS terminal, messaging module 104(c) can be configured to facilitate the exchange and analysis of authorization messages. For example, messaging module 104(c) can generate an authorization request message for an electronic payment transaction, receive an authorization response message for the transaction (e.g., from an account issuer computer via a payment processing network), and can provide an indication of the authorization decision using output device 104(e). Such authorization messages can be transmitted and received by receiver device 104 using, for example, network interface 104(d). In some embodiments, network interface 104(d) can be configured to exchange data messages with a payment processing network, acquirer computer, issuer computer, gateway computer, processor computer, or other computing device using any suitable communication protocol (e.g., ISO 8583).

Figure 5:
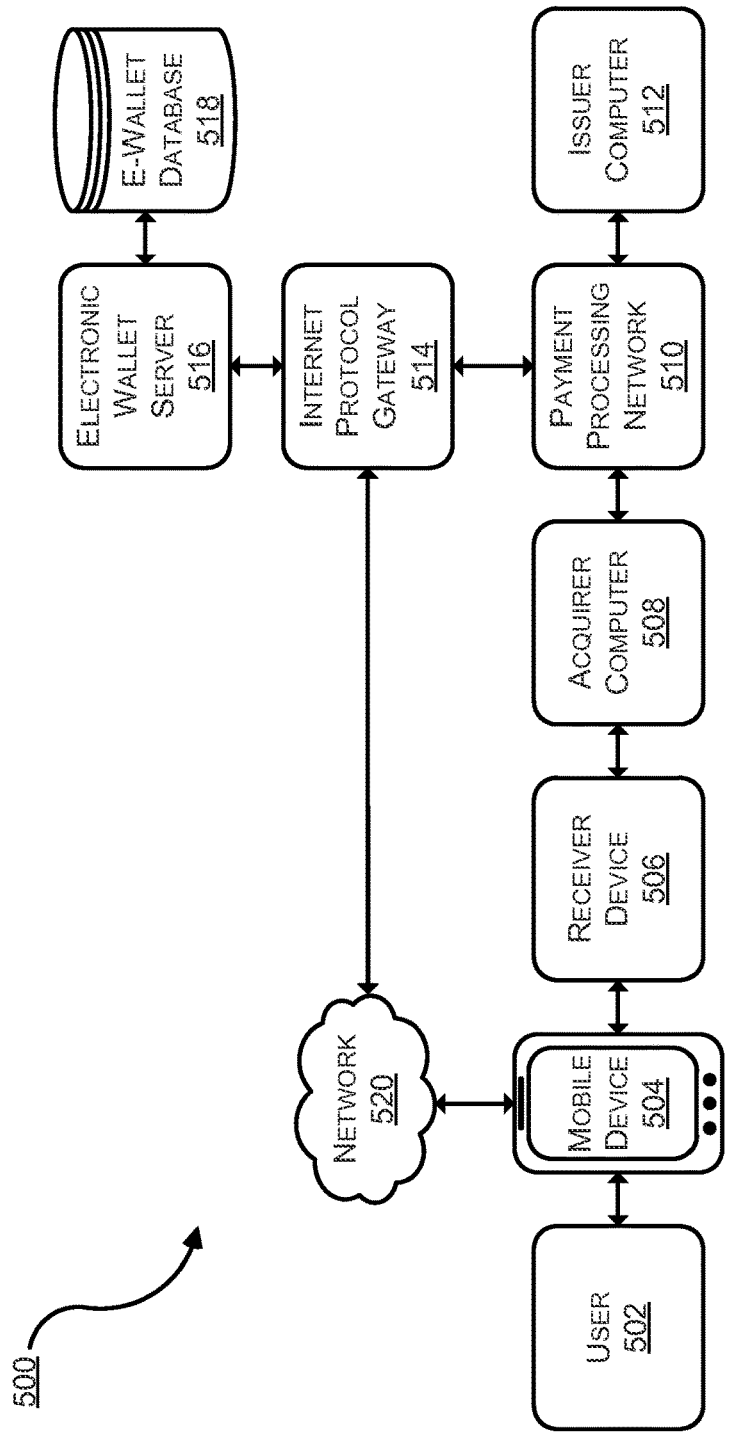
FIG. 5 illustrates a block diagram of an exemplary mobile payment processing system in accordance with some embodiments.

In some embodiments, as described herein, motion-based communication mode selection can be performed in the context of an electronic payment transaction. FIG. 5 illustrates a block diagram of an exemplary mobile payment processing system 500 in accordance with some embodiments.

System 500 may include one or more users, mobile devices, receiver devices, acquirer computers, networks, and issuers computers. For example, as illustrated in FIG. 5, system 500 can include a user 502 having a mobile device 504 (e.g., corresponding to mobile device 102 shown in FIG. 1 and described above). User 502 can be an individual, an organization such as a business, or any other suitable entity capable of purchasing goods and/or services using mobile device 504.

Mobile device 504 can be in any suitable form as described above with respect to mobile device 102. System 500 can further include receiver device 506 such as a mobile POS terminal which may be operated by a merchant. As used herein, a "merchant" may refer to an entity that engages in transactions and that can sell goods and/or services to consumers. Receiver device 506 can be in any suitable form as described above with respect to receiver device 104. Receiver device 106 may also be in any suitable form. Receiver device 506 can include external communication interfaces (e.g., communication interface 104(f) and network interface 104(d)) for communicating with payment devices (e.g., mobile device 504) and other entities in system 500, system memory (e.g., memory 104(b)), and a data processor (e.g., processor 104(a)) for facilitating the exchange of electronic data messages.

System 500 may further include an acquirer computer 508 operated by an acquirer. As used herein, an "acquirer" may refer to a business entity (e.g., a commercial bank or financial institution) that has a business relationship with a particular merchant or similar entity, and that facilitates clearing, settlement, and any other suitable aspect of electronic payment transactions. Acquirer computer 507 may include an external communication interface (e.g., for communicating with receiver device 506, a payment processing network 510, or other entity), system memory comprising one or more modules to generate and utilize electronic messages, and a data processor for facilitating the exchange of electronic data messages.

System 500 may further include an issuer computer 512 operated by an issuer. As used herein, an "issuer" may refer to a business entity (e.g., a bank or other financial institution) that maintains financial accounts for consumers and that may issue payment accounts and consumer payment devices (e.g., credit cards, debit cards, and the like) used to access funds of such accounts. Some entities may perform both issuer and acquirer functions. Issuer computer 512 may include an external communication interface (e.g., for communicating with payment processing network 510 or other entity), system memory comprising one or more modules to generate and utilize electronic messages, and a data processor for facilitating the exchange of electronic data messages.

Payment processing network 510 may be included in system 500, and can include data processing subsystems, networks, and operations used to support and deliver authorization services, exception file services, and clearing and settlement services. For example, payment processing network 510 may comprise a server computer, coupled to a network interface (e.g. by an external communication interface), and a database(s) of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. Payment processing network 510 may include an external communication interface (e.g., for communicating with acquirer computer 508, issuer computer 512, or other entity in system 500), system memory comprising one or more modules to generate and utilize electronic messages, and a data processor for facilitating the exchange of electronic data messages.

In some embodiments, to conduct an electronic payment transaction, user 502 may cause mobile device 504 to interact with receiver device 506 in accordance with the motion-based communication mode techniques described herein. Account information associated with a payment account of user 502 can then be received at receiver device 506 and transmitted to issuer computer 512 via acquirer computer 508 and payment processing network 510.

Receiver device 506, acquirer computer 508, payment processing network 510, and issuer computer 512 may be in operative communication with each other. For example, as described above, some or all of these components of system 500 can include an external communication interface. As used herein, an "external communication interface" may refer to any hardware and/or software that enables data to be transferred between two or more components/entities of system 500 (e.g., between devices residing at locations such as at an issuer, acquirer, merchant, payment processing network, etc.). Some examples of external communication interfaces may include a modem, a network interface (such as an Ethernet card), a communications port, a Personal Computer Memory Card International Association (PCMCIA) slot and card, and the like. Data transferred via an external communications interface may be in the form of signals which may be electrical, electromagnetic, optical, or any other signal capable of being received by the external communications interface. These electronic data messages that may comprise data or instructions may be provided between one or more of the external communications interface via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable method.

As would be understood by one of ordinary skill in the art, any suitable communications protocol for storing, representing, and transmitting data between components/entities of system 500 may be used. Some examples of such methods may include utilizing predefined and static fields (such as in core TCP/IP protocols); "Field: Value" pairs (e.g., HTTP, FTP, SMTP, POP3, and SIP); an XML based format; and/or Tag-Length-Value format.

In some embodiments, mobile device 504 payment device 104 can facilitate an "electronic" or "digital wallet" that may be used to conduct an electronic payment transaction. In such embodiments, an electronic wallet server 516 may be in operational communication with mobile device 504, payment processing network 510, and/or other entity in system 500. For example, electronic wallet server 516 may communicate with mobile device 514 across a network 520 (e.g., the Internet) and using an internet protocol gateway (IPG) 514. Electronic wallet server 516 may maintain an association between the user's digital wallet and one or more payment accounts (e.g., credit, debit, prepaid accounts, and the like) in an electronic wallet database 518. Electronic wallet server 516 can provide a web interface (e.g. through one or more web pages) to receive and transmit requests for payment services and/or may provide an application program interface (API) on mobile device 504 to provide the web service.

Many of the data processing functions and features of some embodiments of the invention may be present in mobile device 504. It should be understood, however, that such functions and features could be present in other components/entities of system 500 in some embodiments.

A description of a typical electronic transaction flow using system 500 may be helpful in understanding embodiments of the invention. As an initial step, user 502 can attempt to purchase goods and/or services from a merchant. In embodiments of the invention, this can involve a motion-based transaction mode selection technique where user 502 causes mobile device 504 to move in a predetermined manner to select the desired communication mode and protocol for initiating the electronic payment transaction. Upon mapping the detected motion to a particular communication mode, mobile device 504 can generate and provide a data message including payment account information to receiver device 506.

Receiver device 506 can then generate an authorization request message for the transaction including information such as the transaction amount, information about the user's payment account, etc., and can transmit this data message to acquirer computer 508. The authorization request message can then be transmitted by acquirer computer 508 to payment processing network 510 which may forward the message to issuer computer 512 operated by the issuer of the user's payment account.

Upon receipt of the authorization request message, issuer computer 512 can perform a number of processes (e.g., verifying the account, confirming that the account has a sufficient balance or available credit to cover the amount of the transaction, consumer fraud detection, and/or other processes) to determine whether to authorize the transaction. After making an authorization decision, an authorization response message is generated by issuer computer 512 including an indication of the authorization decision. The authorization response message is transmitted by issuer computer 512 to payment processing network 510, from payment processing network 510 to acquirer computer 508, and then from acquirer computer 508 to receiver device 506. An indication may then be provided by receiver device 506 whether authorization of the transaction has been approved or declined by the issuer. In some embodiments, this may involve displaying an indication of the authorization decision on a display of receiver device 506.

At the end of the day, if the transaction was authorized, a clearing and settlement process can be conducted by payment processing network 510, acquirer computer 508, and issuer computer 512. A clearing process may include the exchange of financial details between acquirer computer 508 and issuer computer 512 across payment processing network 510 to facilitate posting to the user's account and reconciliation of the settlement position. A settlement process may include the actual transfer of funds from the issuer to the acquirer. In some embodiments, to initiate settlement, acquirer computer 508 can transmit a settlement file including an approval code for the transaction (along with other approved transactions in a batch format) to payment processing network 510 which can then communicate with issuer computer 512 and the acquirer computer 508 to facilitate the transfer of funds to an account associated with the merchant operating receiver device 506.

II. Exemplary Methods

Figure 6:
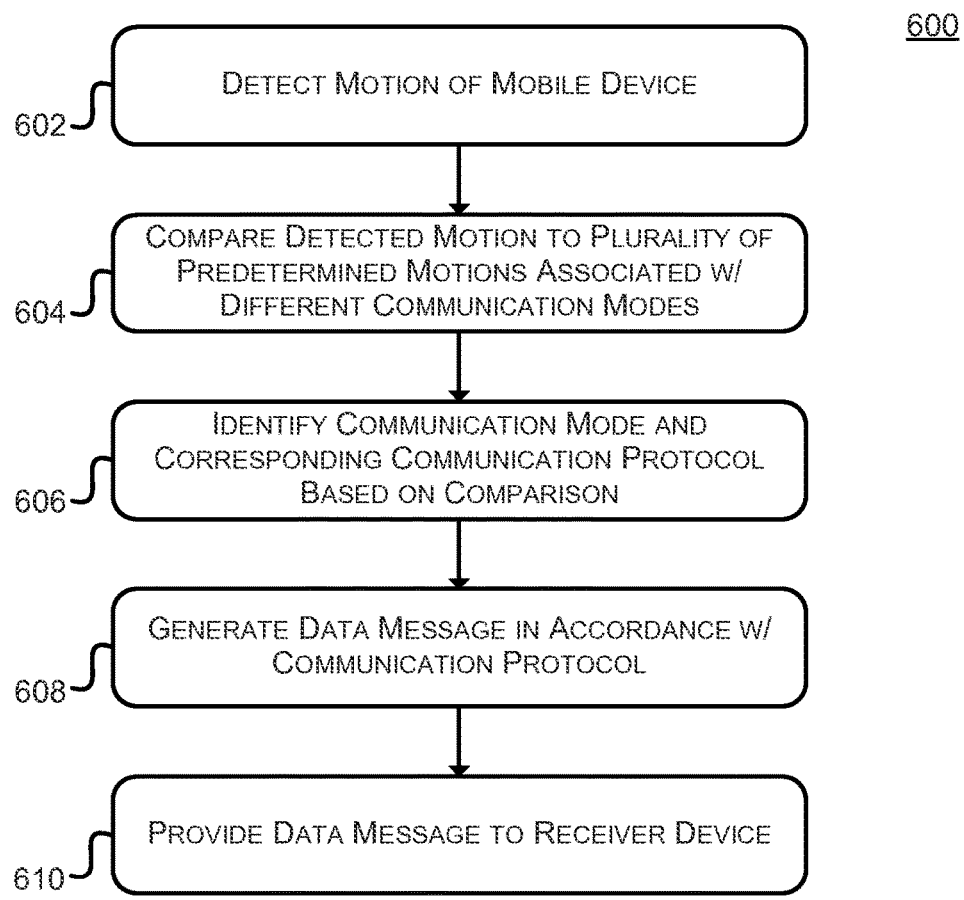
FIG. 6 illustrates a flowchart of an exemplary method of providing motion-based communication mode selection on a mobile device in accordance with some embodiments.

FIG. 6 illustrates a flowchart of an exemplary method 600 of providing motion-based communication mode selection on a mobile device in accordance with some embodiments. The steps of method 600 may be performed, for example, by a mobile device (e.g., mobile device 102, 504, etc.). In other embodiments, one or more steps of method 400 may be performed by another computing device such as a remote server computer or cloud-based device in communication with the mobile device.

In method 600, at step 602, a motion of the mobile device is detected by the mobile device. In some embodiments, the motion of the mobile device is detected by a motion detection sensor of the mobile device that can include one or more of an accelerometer, a gyroscope, a compass, and an altimeter. The detected motion of the mobile device can include a rotation of the mobile device, a translational motion of the mobile device, or a combination thereof.

At step 604, the mobile device can compare the detected motion of the mobile device to a plurality of predetermined motions, each of the plurality of predetermined motions being associated with a different communication mode of the mobile device. In some embodiments, the plurality of predetermined motions associated with the different communication modes are stored in a memory of the mobile device. Comparing the detected motion of the mobile device to the plurality of predetermined motions, in some embodiments, can include the mobile device calculating a confidence value that the detected motion of the mobile device corresponds to one of the plurality of predetermined motions, and the mobile device comparing the calculated confidence value to a threshold confidence value.

At step 606, the mobile device can identify a communication mode associated with the detected motion of the mobile device based at least in part on the comparison, the identified communication mode corresponding to a communication protocol. Suitable communication protocols can include, but are not limited to, cellular, WiFi, NFC, Bluetooth, two-dimensional barcode, and the like. In some embodiments, identifying the communication mode associated with the detected motion of the mobile device can include the mobile device determining that the calculated confidence value is equal to or greater than the threshold confidence value.

In some embodiments, at step 606 (or step 604), the mobile device can determine a location of the mobile device. The location can be determined using location determination circuitry in the mobile device that receives and/or analyzes data such as GPS data, cellular phone tower triangulation data, cellular phone tower signal strength data, wireless access point location data, an Internet Protocol (IP) address, or the like, or combinations thereof. The location of the mobile device may affect the confidence value calculated by the mobile device since the location may provide an indication as to whether the motion of the mobile device is intended by the user to initiate an associated communication mode. When the location of the mobile device is determined, the communication mode associated with the detected motion can be identified by the mobile device based in part on the determined location and in part on the comparison at step 604.

At step 608, the mobile device can generate a data message in accordance with the communication protocol corresponding to the identified communication mode. And, at step 610, the data message can be provided by the mobile device to a receiver device. In some embodiments, providing the data message to the receiver device can include the mobile device wirelessly transmitting the data message to the receiver device. In some embodiments, providing the data message to the receiver device can include the mobile device displaying the data message on a display screen of the mobile device. In such embodiments, the receiver device may have hardware (e.g., an optical scanner) configured to read the data message from the display screen of the mobile device.

FIGS. 7A-9C provide various illustrations of motion-based communication mode selection in accordance with method 600. The illustrations depicted in FIGS. 7A-9C correspond to a mobile device identifying and initiating different communication modes of the mobile device in response to different predetermined motions, and in different operational contexts including electronic payment transactions and messaging applications.

Figure 7A:
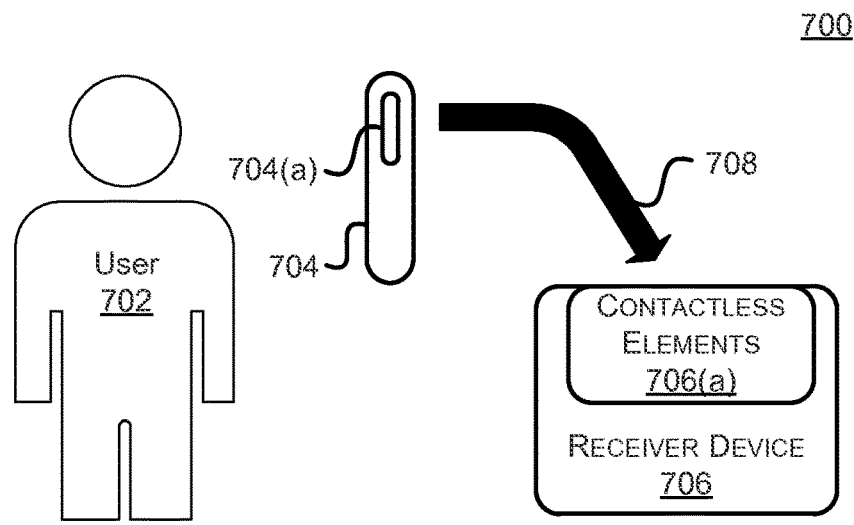
FIGS. 7A-7B illustrate an exemplary sequence for initiating an NFC communication mode on a mobile device in accordance with some embodiments.
Figure 7B:
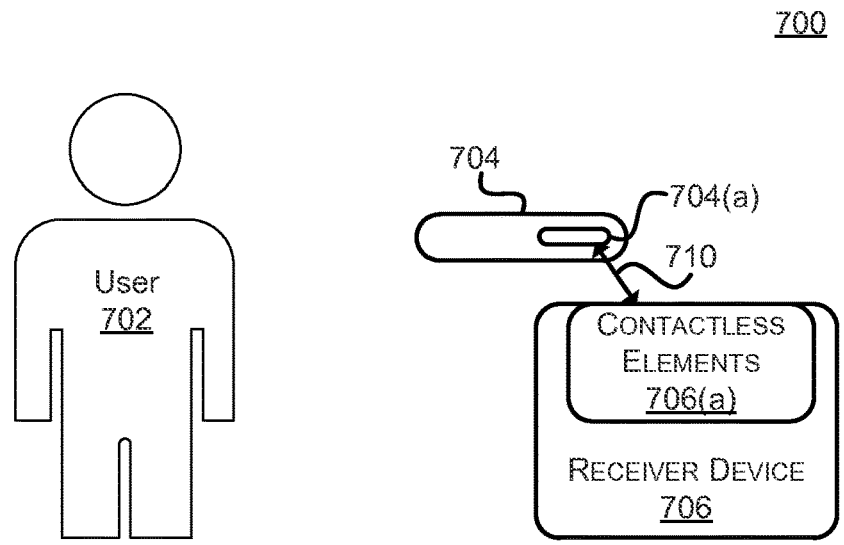

In FIGS. 7A-7B, an exemplary sequence 700 for initiating an NFC communication mode on a mobile device in accordance with some embodiments is illustrated. As shown in FIG. 7A, a user 702 can be in possession of a mobile device 704 including contactless elements 704(a). User 702 is in proximity to a receiver device 706 including contactless elements 706(a). In sequence 700, receiver device 706 can be a merchant POS terminal and user 702 may wish to conduct an electronic payment transaction using mobile device 704 in accordance with an NFC protocol. A memory of mobile device 704 may store a data table that associates a predetermined downward motion of mobile device 704 with an NFC communication mode of mobile device 704. As shown in FIG. 7A, user 702 can initiate a downward motion 708 of mobile device 704 corresponding to the downward motion stored in the memory.

A motion detection sensor (e.g., an accelerometer) in mobile device 704 can detect motion 708 and transmit a signal identifying the motion to a processor of mobile device 704. The processor can then compare detected motion 708 to a plurality of predetermined motions (including the downward motion) stored in the memory. For example, mobile device 704 can determine that detected motion 708 is substantially similar to the stored downward motion. Using the processor, mobile device 704 can calculate a confidence value that detected motion 708 corresponds to the stored downward motion based on, for example, similarities between the relative starting and ending position of mobile device 704, the path of travel, and/or other factors.

As shown in FIG. 7B, the downward motion 708 may result in mobile device 704 (and contactless elements 704(a)) being in proximity to contactless elements 706(a) of receiver device 706. Upon identifying the NFC communication mode in response to detecting motion 708, comparing it to motions stored in the memory, and determining that the calculated confidence value meets (or exceeds) a threshold value corresponding to the detected motion 708 and associated NFC communication mode, mobile device 704 can then initiate the NFC communication mode. In FIG. 7B, this can involve contactless elements 704(a) of mobile device 704 transmitting an NFC message 710 (e.g., including payment data) to contactless elements 706(a) of receiver device 706, thereby initiating the electronic payment transaction in accordance with the NFC protocol desired by user 702. In some embodiments, receiver device 706 can then use the received data to generate an authorization request message in accordance with the electronic transaction processing flow described above with respect to FIG. 5.

Figure 8A:
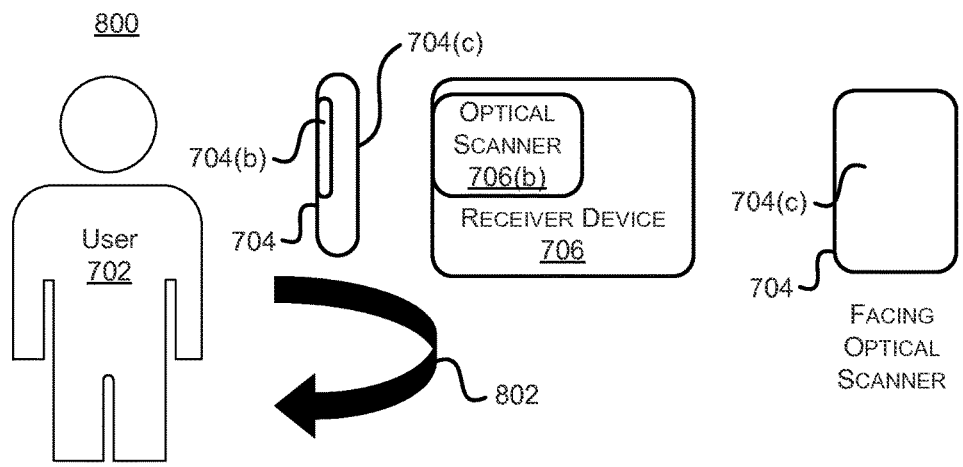
FIGS. 8A-8B illustrate an exemplary sequence for initiating a two-dimensional barcode communication mode on a mobile device in accordance with some embodiments.
Figure 8B:
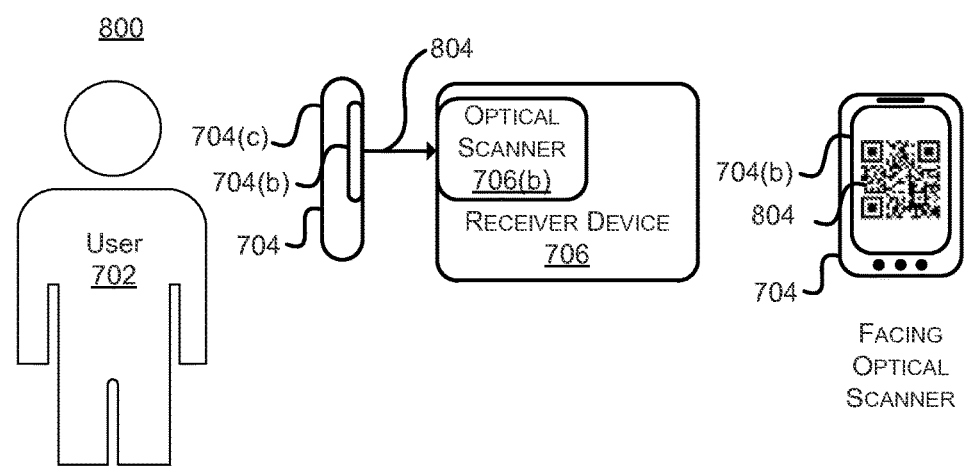

FIGS. 8A-8B illustrate an exemplary sequence 800 for initiating a two-dimensional barcode communication mode on a mobile device in accordance with some embodiments. Sequence 800 illustrated in FIGS. 8A-8B includes the same user 702, mobile device 704, and receiver device 706 depicted in sequence 700. In this illustration, however, user 702 can conduct an electronic payment transaction in accordance with a two-dimensional barcode protocol instead of the NFC protocol depicted in sequence 700 of FIGS. 7A-7B.

As shown in FIG. 8A, mobile device 704 can include a display screen 704(b), and receiver device 706 can include an optical scanner 706(b) configured to read two-dimensional barcodes. As further shown in FIG. 8A, prior to user initiating a motion of mobile device 704, a back face 704(c) (e.g., opposite display screen 704(b)) may be facing receiver device 706. The data table stored in the memory of mobile device 704 may associate a rotational motion of mobile device 704 with a two-dimensional barcode communication mode of mobile device 704. As shown in FIG. 7A, user 702 can initiate a rotation 802 of mobile device 704 corresponding to the rotation stored in the memory.

A motion detection sensor (e.g., a gyroscope) in mobile device 704 can detect rotation 802 motion and transmit a signal identifying the motion to the processor of mobile device 704. The processor can then compare the detected rotation 802 to a plurality of predetermined motions (including the rotational motion) stored in the memory. For example, mobile device 704 can determine that detected rotation 802 is substantially similar to the stored rotational motion. Using the processor, mobile device 704 can calculate a confidence value that detected rotation 802 corresponds to the stored rotational motion based on, for example, similarities between the axis of rotations, degree of rotation (e.g., 180°), and/or other factors.

In some embodiments, a rotation of mobile device 704 such as detected rotation 802 may be a common motion used in other contexts unrelated to electronic payment transactions. Thus, even if detected rotation 704 accurately matches the predetermined motion stored in the memory, the user may not have intended for detected motion 802 to initiate the two-dimensional barcode communication mode. In some embodiments, mobile device 704 can also include location determination circuitry (not shown). In sequence 800, mobile device 704 can determine its current location including such circuitry, the location in this illustration being at a merchant. In some embodiments, this determination can be made by comparing the geo-coordinates (or street address) of mobile device 704 with a database of mappings between merchants and geo-coordinates or street addresses, the database being stored in the memory of mobile device 704 or accessible from a remote server computer. Using such a database, the presence of mobile device 704 at the merchant can be confirmed. This may also increase the confidence value calculated by the processor of mobile device 704.

As shown in FIG. 8B, rotation 802 may result in display 704(*b*) facing optical scanner 706(*b*) of receiver device 706. Upon identifying the two-dimensional barcode communication mode in response to detecting rotation 802, comparing it to motions stored in the memory, determining the current location of mobile device 704, and determining that the calculated confidence value meets (or exceeds) a threshold value, mobile device 704 can then initiate the two-dimensional barcode communication mode. In FIG. 8B, this can involve processor of mobile device 704 generating a two-dimensional barcode 804 (e.g., including encoded payment data), and displaying barcode 804 on display screen 704(*b*). Optical scanner 706(*b*) of receiver device 706 can then optically receive and decode the data contained in barcode 804, thereby initiating the electronic transaction in accordance with the two-dimensional barcode protocol desired by user 702. In some embodiments, receiver device 706 can then use the received data to generate an authorization request message in accordance with the electronic transaction processing flow described above with respect to FIG. 5.

Figure 9A:
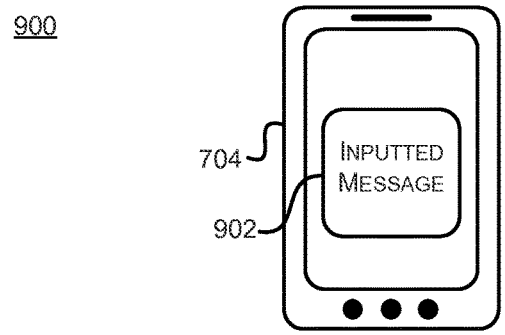
FIGS. 9A-9C illustrate an exemplary sequence for initiating a messaging communication mode on a mobile device in accordance with some embodiments.
Figure 9B:
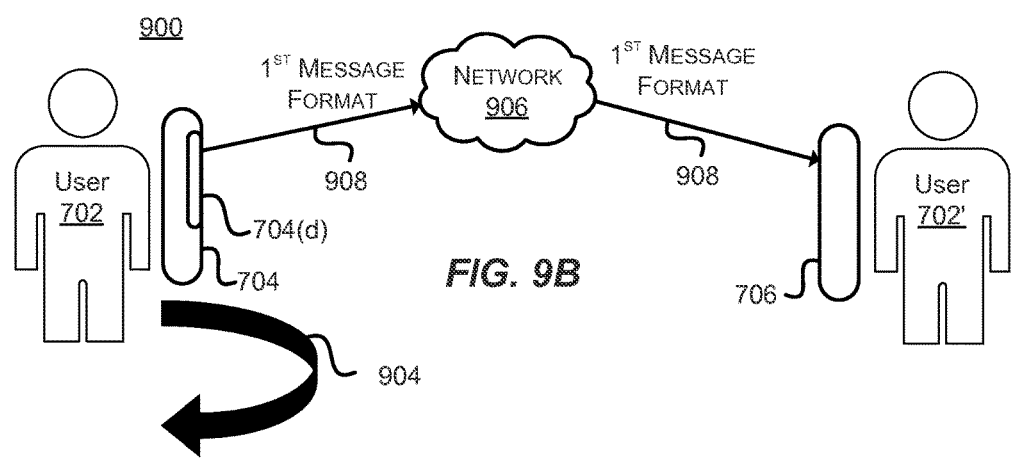
Figure 9C:
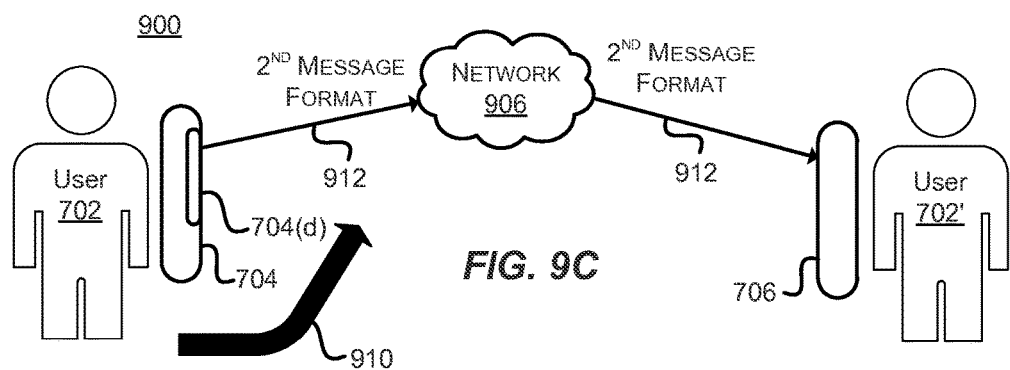

FIGS. 9A-9C illustrate an exemplary sequence 900 for initiating a messaging communication mode on a mobile device in accordance with some embodiments. Sequence 900 illustrated in FIGS. 9A-9C includes the same user 702 and mobile device 704 illustrated in sequences 700 and 800. In this illustration, however, receiver device 706 may be another mobile device in possession of another user 702' to which user 702 desires to send an electronic message 902 inputted by user 702 into mobile device 704. As seen in FIG. 9A, mobile device 704 can further include WiFi elements 704(*d*) configured to transmit electronic messages over the Internet or a cellular network, for example.

In this illustration, the data table stored in the memory of mobile device 704 may associate a predetermined rotation with a first message format (e.g., an email format), and may further associate an upward translational motion with a second message format (e.g., an SMS text message). As shown in FIG. 9B, if user 702 wishes to send message 902 in the first message format to user 702', user 702 can cause mobile device 704 to rotate 904 in accordance with the predetermined rotation stored in the memory of mobile device 704. Upon detecting rotation 904, comparing it to the predetermined motions stored in the memory, and determining that the calculated confidence value meets (or exceeds) the corresponding threshold value, the processor of mobile device 704 can initiate a communication mode associated with the first message format. As seen in FIG. 9B, this can involve mobile device 704 sending message 902 as a formatted message 908 in the first message format to receiver device 706 of user 702' via a network 906 (e.g., a WiFi network connected to the Internet).

Alternatively, as shown in FIG. 9C, user 702 may instead wish to send message 902 in the second message format. In this illustration, instead of rotation 904, user 702 can move mobile device 704 in an upward translational motion 910 in accordance with the predetermined upward motion stored in the memory of mobile device 704. Upon detecting motion 910, comparing it to the predetermined motions stored in the memory, and determining that the calculated confidence value meets (or exceeds) the corresponding threshold value, the processor of mobile device 704 can initiate a communication mode associated with the second message format. As seen in FIG. 9C, this can involve mobile device 704 sending message 902 as a formatted message 912 in the second message format to receiver device 706 of user 702' via network 906.

In some embodiments, in a further effort to avoid false positives, the user may be required to open an application on their mobile device before initiating a predetermined motion of the mobile device. For example, a payment application or other suitable application can be opened by way of one or more buttons on the mobile device, touch input (e.g., a selection or specified gesture) provided by the user on a touch screen of the mobile device, and/or one or more predetermined motions of the mobile device. Further, in some embodiments, data other than that received at location determination circuitry of the mobile device can be used to confirm a location of the mobile device. For example, in some embodiments, a merchant may provide a data beacon (e.g., in a Bluetooth format) by way of a transmitter near the merchant's front entrance, near the check-out area at the POS terminal, etc. Such a beacon may be detected by the mobile device, and may confirm that the mobile device is located at a merchant.

III. Exemplary Computer Apparatus

The various participants and elements described herein with reference to FIGS. 1-9C may operate one or more computer apparatus to facilitate the functions described herein. Any of the elements in FIGS. 1-9C may use any suitable number of subsystems to facilitate the functions described herein.

Figure 10:
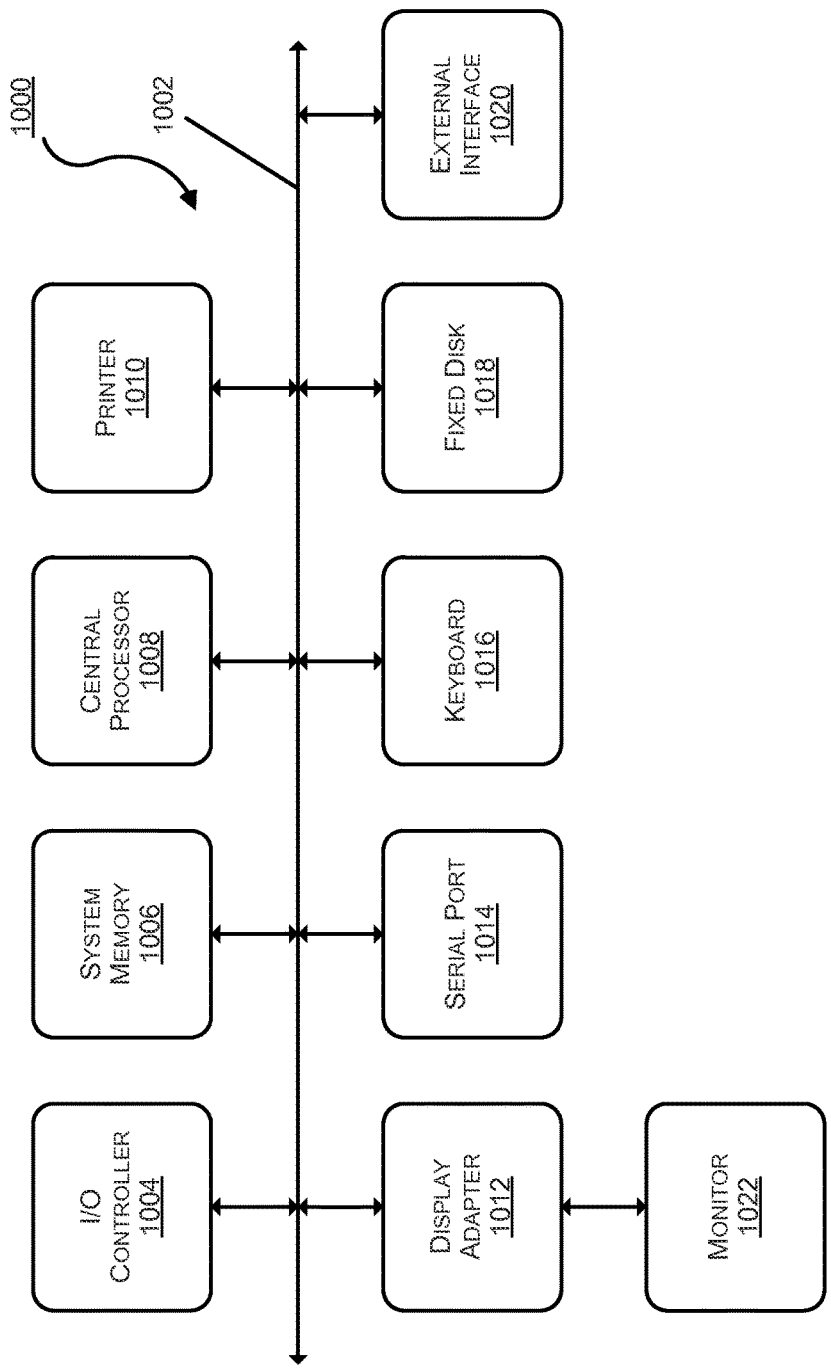
FIG. 10 illustrates a block diagram of an exemplary computer apparatus in accordance with some embodiments.

Examples of such subsystems or components are shown in FIG. 10 which illustrates exemplary computer apparatus 1000. The subsystems shown in FIG. 10 are interconnected via a system bus 1002. Additional subsystems such as a printer 1010, keyboard 1016, fixed disk 1018 (or other memory comprising computer readable media), monitor 1022, which is coupled to a display adapter 1012, and others are shown. Peripherals and input/output (I/O) devices, which couple to I/O controller 1004 (which can be a processor or other suitable controller), can be connected to the computer system by any number of means known in the art, such as a serial port 1014. For instance, serial port 1014 or an external interface 1020 can be used to connect computer apparatus 1000 to a wide area network such as the Internet, a mouse input device, or a scanner. The interconnection via system bus 1002 allows a central processor 1008 to communicate with each subsystem and to control the execution of instructions from a system memory 1006 or fixed disk 1018, as well as the exchange of information between subsystems. System memory 1006 and/or fixed disk 1018 may embody a computer readable medium (e.g., a non-transitory computer readable medium).

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A mobile device comprising:
    a motion detection sensor configured at least to detect rotation of the mobile device;
    a communication interface; and
    a processor coupled to the motion detection sensor and the communication interface, the processor configured to, at least:
        receive a signal from the motion detection sensor, the signal identifying a motion of the mobile device detected by the motion detection sensor with a level of confidence;
        compare the detected motion of the mobile device to a plurality of predetermined motions of the mobile device, each of the plurality of predetermined motions of the mobile device being associated with a different communication mode of the mobile device and a corresponding threshold level of confidence, the comparison of the detected motion with the plurality of predetermined motions of the mobile device including comparing the level of confidence of the detected motion with the corresponding threshold level of confidence, the level of confidence of the detected motion of the mobile device being calculated by the mobile device based at least in part on one or more similarities between the detected motion of the mobile device and a predetermined motion of the plurality of predetermined motions of the mobile device, wherein the threshold level of confidence is adjusted based at least in part on a type of location of the mobile device during the comparison, the type of location being one of a plurality of types of location;
        identify a communication mode associated with the detected motion of the mobile device based at least on part on the comparison, the identified communication mode corresponding to a communication protocol;
        generate a data message in accordance with the communication protocol; and
        provide the data message to a receiver device via the communication interface.

2. The mobile device of claim 1, wherein providing the data message to the receiver device comprises wirelessly transmitting the data message to the receiver device.

3. The mobile device of claim 1, wherein the communication interface comprises a display screen, and wherein providing the data message to the receiver device comprises displaying the data message on the display screen.

4. The mobile device of claim 1, further comprising location determination circuitry coupled to the processor, the processor being further configured to:
    receive a signal from the location determination circuitry, the signal identifying a geographical location of the mobile device determined by the location determination circuitry; and
    identify the communication mode associated with the detected motion of the mobile device based in part on the determined geographical location of the mobile device and in part on the comparison.

5. The mobile device of claim 1, wherein the motion detection sensor comprises one or more of an accelerometer, a gyroscope, a compass, and an altimeter.

6. The mobile device of claim 1, wherein the detected motion of the mobile device comprises a rotation of the mobile device.

7. The mobile device of claim 1, wherein the detected motion of the mobile device comprises a translational motion of the mobile device.

8. The mobile device of claim 1, further comprising a memory coupled to the processor, the memory storing the plurality of predetermined motions associated with the different communication modes of the mobile device.

9. A method for motion-based selection of a communication mode, the method comprising:
    detecting, by a motion detection sensor of a mobile device, a motion of the mobile device with a level of confidence, the motion detection sensor configured at least to detect rotation of the mobile device;

comparing, by the mobile device, the detected motion of the mobile device to a plurality of predetermined motions of the mobile device, each of the plurality of predetermined motions of the mobile device being associated with a different communication mode of the mobile device and a corresponding threshold level of confidence, the comparison of the detected motion with the plurality of predetermined motions of the mobile device including comparing the level of confidence of the detected motion with the corresponding threshold level of confidence, the level of confidence of the detected motion of the mobile device being calculated by the mobile device based at least in part on one or more similarities between the detected motion of the mobile device and a predetermined motion of the plurality of predetermined motions of the mobile device, wherein the threshold level of confidence is adjusted based at least in part on a type of location of the mobile device during the comparison, the type of location being one of a plurality of types of location;

identifying, by the mobile device, a communication mode associated with the detected motion of the mobile device based at least on part on the comparison, the identified communication mode corresponding to a communication protocol;

generating, by the mobile device, a data message in accordance with the communication protocol; and providing, by the mobile device, the data message to a receiver device.

10. The method of claim 9, wherein providing the data message to the receiver device comprises:

wirelessly transmitting, by the mobile device, the data message to the receiver device.

11. The method of claim 9, wherein providing the data message to the receiver device comprises:

displaying, by the mobile device, the data message on a display screen of the mobile device.

12. The method of claim 9, further comprising:

determining, by the mobile device, a geographical location of the mobile device; and identifying, by the mobile device, the communication mode associated with the detected motion of the mobile device based in part on the determined geographical location of the mobile device and in part on the comparison.

13. The method of claim 9, wherein the motion of the mobile device is detected by a motion detection sensor of the mobile device, the motion detection sensor comprising one or more of an accelerometer, a gyroscope, a compass, and an altimeter.

14. The method of claim 9, wherein the detected motion of the mobile device comprises a rotation of the mobile device.

15. The method of claim 9, wherein the detected motion of the mobile device comprises a translational motion of the mobile device.

16. The method of claim 9, wherein the plurality of predetermined motions associated with the different communication modes of the mobile device are stored in a memory of the mobile device.

17. The mobile device of claim 1, wherein the one or more similarities between the detected motion and the predetermined motion includes a similarity between an axis of rotation of the detected motion and an axis of rotation of the predetermined motion.

18. One or more non-transitory computer-readable media collectively having stored thereon computer-executable instructions that, when executed with one or more computers, collectively at least:

detect, by a motion detection sensor of a mobile device, a motion of the mobile device with a level of confidence, the motion detection sensor configured at least to detect rotation of the mobile device;

compare, by the mobile device, the detected motion of the mobile device to a plurality of predetermined motions of the mobile device, each of the plurality of predetermined motions of the mobile device being associated with a different communication mode of the mobile device and a corresponding threshold level of confidence, the comparison of the detected motion with the plurality of predetermined motions of the mobile device including comparing the level of confidence of the detected motion with the corresponding threshold level of confidence, the level of confidence of the detected motion of the mobile device being calculated by the mobile device based at least in part on one or more similarities between the detected motion of the mobile device and a predetermined motion of the plurality of predetermined motions of the mobile device, wherein the threshold level of confidence is adjusted based at least in part on a type of location of the mobile device during the comparison, the type of location being one of a plurality of types of location;

identify, by the mobile device, a communication mode associated with the detected motion of the mobile device based at least on part on the comparison, the identified communication mode corresponding to a communication protocol;

generate, by the mobile device, a data message in accordance with the communication protocol; and provide, by the mobile device, the data message to a receiver device.

* * * * *